(12) United States Patent
Fukai et al.

(10) Patent No.: US 9,457,675 B2
(45) Date of Patent: Oct. 4, 2016

(54) ACTUATOR

(71) Applicant: MURAKAMI CORPORATION, Shizuoka (JP)

(72) Inventors: Akira Fukai, Shizuoka (JP); Hiroya Miwa, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 14/648,052

(22) PCT Filed: Dec. 11, 2013

(86) PCT No.: PCT/JP2013/083248
§ 371 (c)(1),
(2) Date: May 28, 2015

(87) PCT Pub. No.: WO2014/097946
PCT Pub. Date: Jun. 26, 2014

(65) Prior Publication Data
US 2015/0343913 A1 Dec. 3, 2015

(30) Foreign Application Priority Data
Dec. 19, 2012 (JP) .................................. 2012-276575

(51) Int. Cl.
*B60L 11/18* (2006.01)
*H01R 13/639* (2006.01)

(52) U.S. Cl.
CPC ......... *B60L 11/1818* (2013.01); *H01R 13/639* (2013.01); *B60L 2270/32* (2013.01); *B60L2270/34* (2013.01); *Y02T 10/7005* (2013.01); *Y02T 10/7072* (2013.01); *Y02T 90/14* (2013.01); *Y02T 90/16* (2013.01); *Y10T 74/20654* (2015.01)

(58) Field of Classification Search
CPC . H01R 13/639; H01R 13/64; B60L 11/1818; Y10T 74/20654
USPC ................................................. 74/53, 55, 56
See application file for complete search history.

(56) References Cited

U.S. PATENT DOCUMENTS

| | | | | |
|---|---|---|---|---|
| 4,459,945 A | * | 7/1984 | Chatfield | F01B 9/023 123/197.2 |
| 2005/0235764 A1 | * | 10/2005 | Johnson | F01B 9/026 74/55 |
| 2014/0137675 A1 | * | 5/2014 | Suzuki | F01L 13/00 74/55 |

FOREIGN PATENT DOCUMENTS

| | | |
|---|---|---|
| JP | 2002-285745 | 10/2002 |
| JP | 2007-302216 | 11/2007 |
| JP | 2012-181985 | 9/2012 |
| JP | 2012-199013 | 10/2012 |
| JP | 2012-209098 | 10/2012 |

OTHER PUBLICATIONS

International Search Report (with English-language translation) for PCT/JP2013/083248 having a mailing date of Mar. 18, 2014.

* cited by examiner

*Primary Examiner* — David M Fenstermacher
*Assistant Examiner* — Randell J Krug
(74) *Attorney, Agent, or Firm* — Greenblum & Bernstein, P.L.C.

(57) ABSTRACT

An actuator containing a drive mechanism that moves a locking pin forward and backward. Said drive mechanism is provided with the following: a holder that holds the locking pin; a cam member that has a cam gear; and a power-transmitting member in which a lower gear to which power from a motor is transmitted and an upper gear coupled to the cam gear are formed. The cam is offset from the center of rotation of the cam gear. The holder is pushed in a forward/backward direction by reciprocal motion of the cam within a range that constitutes less than a full revolution about the center of rotation of the cam gear. A region into which part of the lower gear fits and a region through which the cam moves are provided in a space above one surface of the cam gear.

4 Claims, 7 Drawing Sheets

ACTUATOR

TECHNICAL FIELD

The present invention relates to an actuator.

BACKGROUND ART

The charging of a storage battery installed in a vehicle such as an electric vehicle or a hybrid vehicle is achieved by: coupling a charging connector of a charging cable to a power receiving connector provided to the vehicle body; and supplying electric power to the storage battery via the charging cable.

Among locking mechanisms each configured to prevent the charging connector from coming off the power receiving connector, there is a locking mechanism including: a hook inclinably provided to the charging connector; an engagement protrusion provided to the power receiving connector; and an actuator provided near the power receiving connector (see, for example, Patent Literature 1).

The actuator includes a resin-made housing in which to house a drive mechanism. A locking pin projecting from the housing is capable of extending from and retracting into the housing.

The housing is attached to an inner surface of a wall portion of a charging port of the vehicle body. In addition, the locking pin projects to the outside through an insertion hole in the wall portion of the charging port.

The above-described locking mechanism is designed such that when the charging connector is coupled to the power receiving connector, the hook on the charging connector is brought into engagement with the engagement protrusion on the power receiving connector. In addition, the locking pin of the actuator extends to a position at which the locking pin restricts inclining movement of the hook. Thereby, the hook is fixed in a state of being in engagement with the engagement protrusion. For this reason, it is possible to prevent the charging connector from coming off the power receiving connector.

CITATION LIST

Patent Literature

Patent Literature 1: Japanese Patent Application Publication No. 2012-181985

SUMMARY OF INVENTION

Technical Problem

In the above-described conventional actuator, multiple drive members configured to move the locking pin in the forward-backward direction are housed in the housing. The above-described conventional actuator involves a problem that the housing is large, because the drive members are largely spaced out from one another.

The present invention attempts to provide an actuator capable of: solving the foregoing problem; reducing the size of the space in the housing where the drive members are placed; and reducing the size of the housing.

Solution to Problem

To solve the above problems, the present invention is an actuator which includes: a hollow housing; and a pin projecting from an outer surface of the housing, a drive mechanism housed in the housing, and the drive mechanism configured to extend and retract the pin. The drive mechanism includes: a holder configured to hold the pin; a cam member including a cam gear provided with a cam; a motor; and a drive transmission member in which a first gear and a second gear are formed coaxial with each other, driving force being transmitted from the motor to the first gear, and the second gear being connected to the cam gear. The cam is projectingly provided to one surface of the cam gear, and is eccentric from a center of turn of the cam gear. The cam reciprocatingly turns around the center of turn of the cam member within a range less than one rotation, and thereby pushes out the holder in a direction of extension and retraction of the pin. A space on a side of the one surface of the cam gear includes an area which a part of the first gear enters, and a movement area of the cam.

This configuration does not allow the cam to make one rotation around the center of turn of the cam member. For this reason, the movement area of the cam formed in the space on the side of the one surface of the cam gear becomes smaller. Thereby, in the space on the side of the one surface of the cam gear, the first gear can be placed closer to the center of turn of the cam member. Thus, the space where the cam member and the drive transmission member are placed can be made smaller as shown in FIG. 4. Accordingly, the size of the housing can be reduced.

Moreover, since the first gear is placed closer to the center of turn of the cam gear, the second gear is also placed closer to the center of turn of the cam gear. For this reason, an outer diameter of the cam gear can be made smaller. Thus, the present invention can reduce the size of the housing, can make the outer diameter of the cam gear smaller, and accordingly can cut back material costs.

In the foregoing actuator, a cam housing frame in which to house the cam is formed in the holder; and the cam pushes an inner surface of the cam housing frame, and thereby pushes out the holder in the direction of extension and retraction of the pin. In addition, a recessed portion set back to an inside of the cam housing frame is formed in the holder. The recessed portion is disposed in the space on the side of the one surface of the cam gear, and between the first gear and the cam.

This configuration places the first gear closer to the recessed portion, and thereby can place the first gear closer to the center of turn of the cam gear without allowing the first gear to interfere with the cam housing frame. Furthermore, because the cam housing frame can be formed in an endless shape, the strength of the cam housing frame can be secured sufficiently.

In the foregoing actuator, it is desirable that the first gear interfere with an imaginary movement area of the cam which would make one rotation around the center of turn of the cam gear. This configuration disposes a part of the first gear in an area into which the cam does not move, which is in the imaginary movement area of the cam. Thereby, the first gear can be placed closer to the center of turn of the cam gear.

It should be noted that the state where the first gear interferes with the imaginary movement area of the cam includes a state where an outer peripheral edge portion of the first gear is in touch with an outer peripheral edge portion of the imaginary movement area of the cam.

Advantageous Effects of Invention

In the actuator of the present invention, the space where the cam member and the drive transmission member are placed can be made smaller. For this reason, the size of the housing can be reduced. Furthermore, since the size of the housing can be reduced, and since the outer diameter of the cam gear can be made smaller, material costs can be cut back.

DESCRIPTION OF EMBODIMENTS

Hereinafter, embodiments of the present invention will be described with reference to the accompanying drawings as needed.

Figure 1:
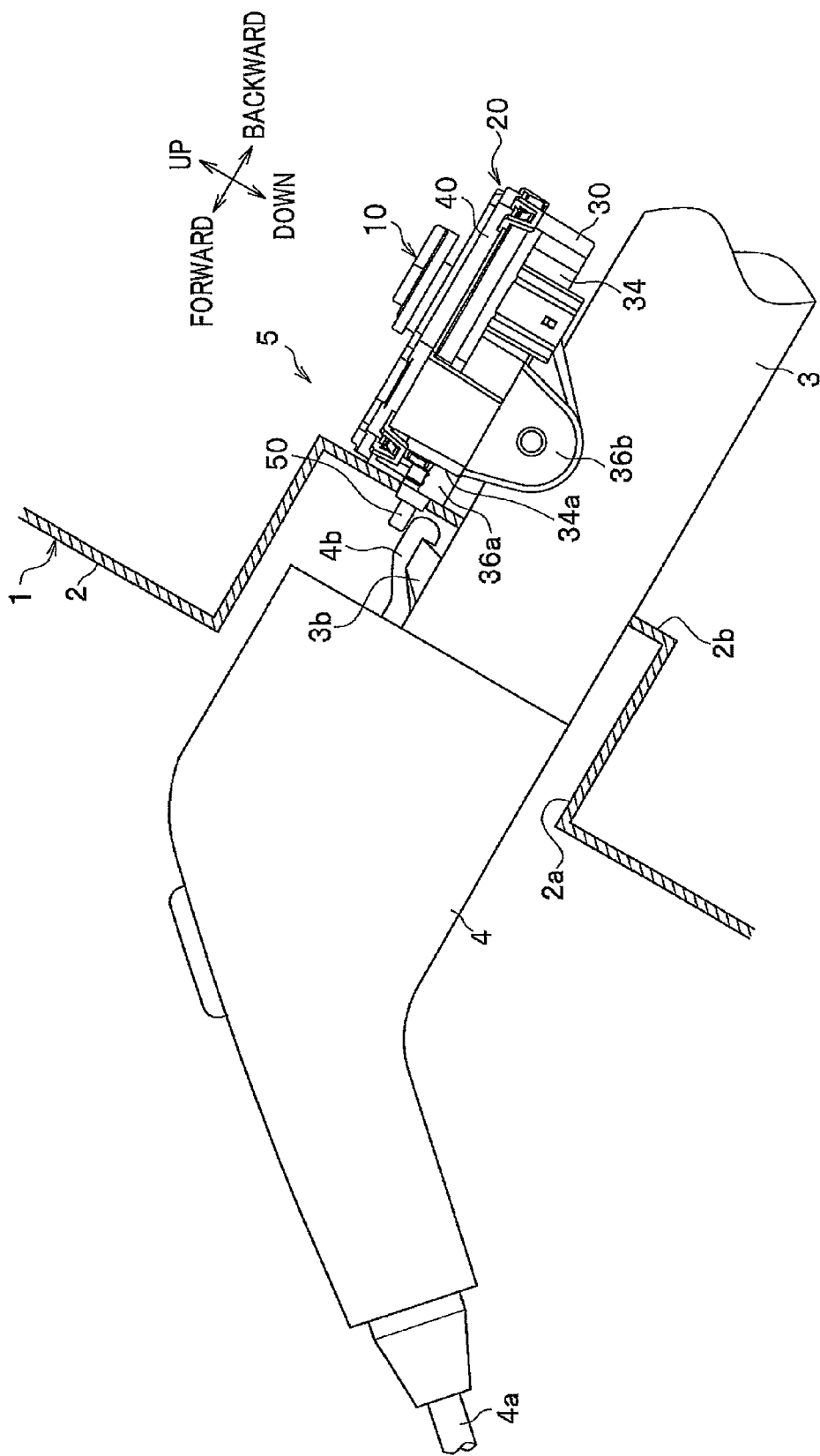
FIG. 1 is a side view showing how an actuator of an embodiment is used.

As shown in FIG. 1, an actuator 10 of an embodiment is a part of a locking mechanism 5 installed in a charging port 2a of a vehicle 1 such as an electric vehicle or a hybrid vehicle. The locking mechanism 5 prevents a charging connector 4 from coming off a power receiving connector 3 while a storage battery (not illustrated) installed in the vehicle 1 is being charged.

It should be noted that the directional references "up," "down," "forward," "backward," "right" and "left" in relation to the actuator 10 in the following descriptions are given just for the sake of convenience in order to describe the structure of the actuator 10, and are not intended to limit the orientation and the like of the actuator 10. FIG. 1 shows how the actuator 10 of the embodiment is installed in the vehicle. As shown in FIG. 1, the actuator 10 of the embodiment is attached to the vehicle in a way that the rear of the actuator 10 is inclined downward at approximately 30 degrees to a horizontal plane.

The charging port 2a in the vehicle body 2 is a space in which a tip end portion of a power receiving connector 3 is housed. The power receiving connector 3 is inserted through an opening in a wall portion 2b of the charging port 2a, and the tip end portion of the power receiving connector 3 projects into the charging port 2a. The power receiving connector 3 is electrically connected to the storage battery (not illustrated) via a cable (not illustrated). It should be noted that the axis of the power receiving connector 3 is inclined at approximately 30 degrees to the horizontal plane in a way that the power receiving connector 3 becomes lower toward the inside of vehicle from a tip end of the power receiving connector 3.

A charging cable 4a is provided to a charging apparatus (not illustrated) such a charging station. A tip end portion of the charging cable 4a is provided with the charging connector 4. The coupling of the charging connector 4 to the power receiving connector 3 enables the storage battery (not illustrated) to be supplied with electric power from the charging apparatus via the charging cable 4a.

The locking mechanism 5 is formed from: a hook 4b provided to a tip end portion of the charging connector 4; an engagement protrusion 3b formed on the tip end portion of the power receiving connector 3; and the actuator 10 provided above the power receiving connector 3. The hook 4b is inclinable in the vertical direction.

As the charging connector 4 is put deeper into the power receiving connector 3, the hook 4b having been in contact with the engagement protrusion 3b moves inclined upward. Thereafter, once the hook 4b climbs over the engagement protrusion 3b, the hook 4b moves inclined downward, and eventually gets into engagement with the engagement protrusion 3b. Once the hook 4b hooks around the engagement protrusion 3b in this manner, a condition is established in which the charging connector 4 cannot be unplugged from the power receiving connector 3.

The actuator 10 restricts the inclining movement of the hook 4b while the hook 4b is in a state of being in engagement with the engagement protrusion 3b. The actuator 10 includes: a housing 20 in which a drive mechanism 100 (see FIG. 3) is housed; and a locking pin 50 projecting from a front surface of the housing 20.

The housing 20 is disposed on the vehicle inner side of the wall portion 2b of the charging port 2a. The locking pin 50 is extendable from and retractable into the housing 20 in the forward-backward direction, and projects into the charging port 2a through an insertion hole formed in the wall portion 2b.

Figure 2:
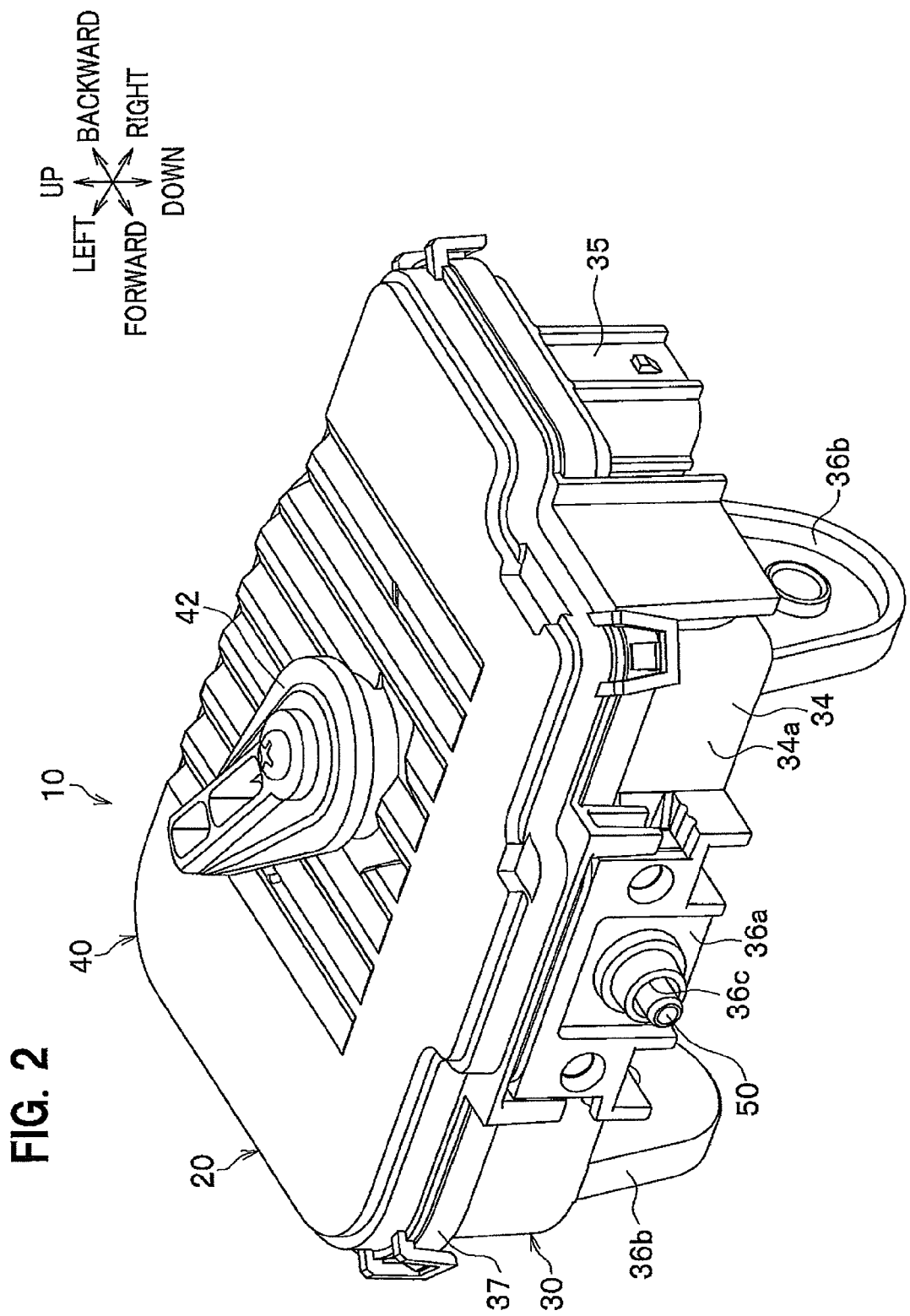
FIG. 2 is a perspective view showing the actuator of the embodiment.
Figure 3:
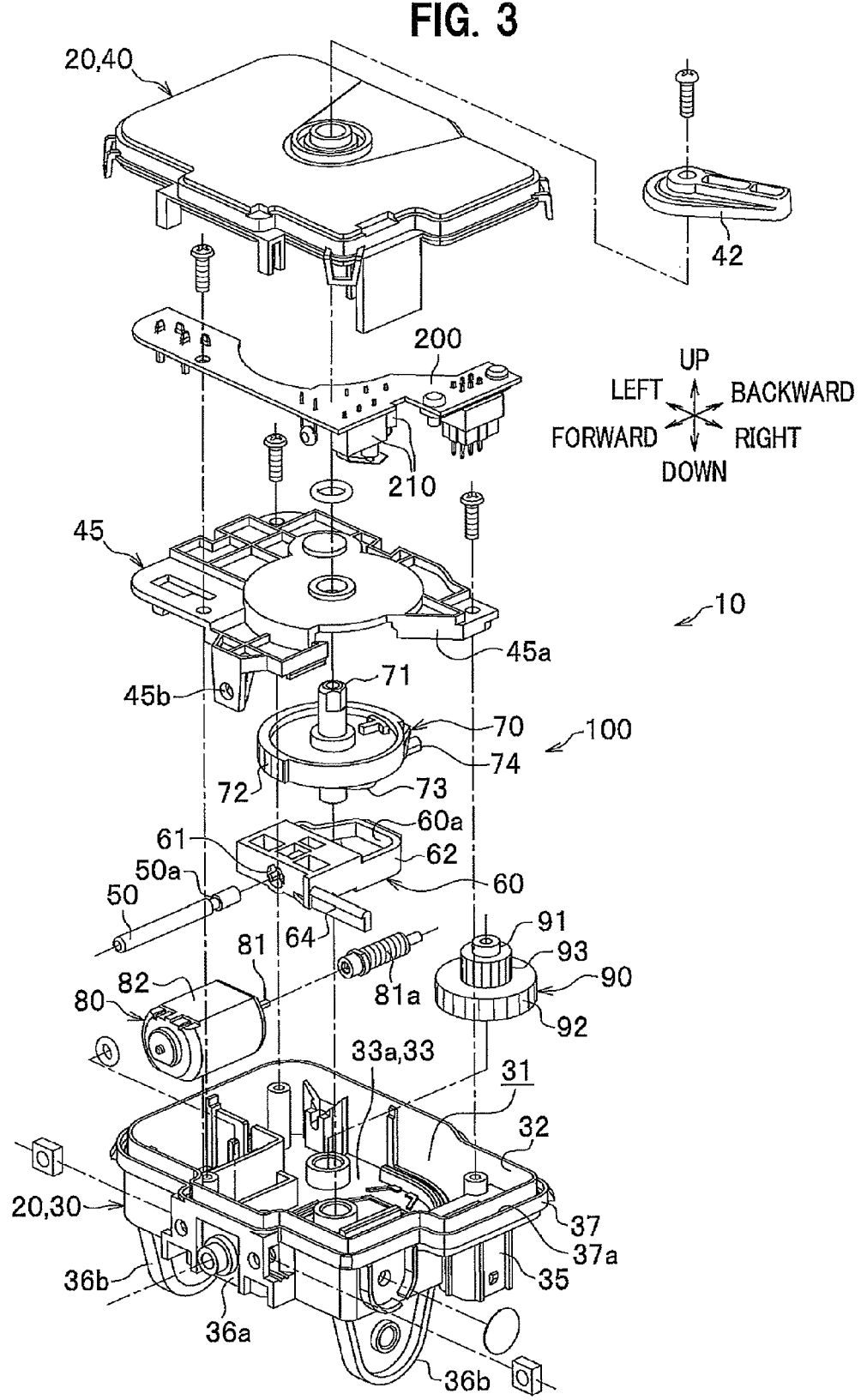
FIG. 3 is an exploded perspective view showing the actuator of the embodiment.

As shown in FIG. 2, the housing 20 is a resin-made box body. The locking pin 50 projects from a hole portion 36c formed in a front surface 34a. As shown in FIG. 3, the housing 20 includes: a housing lower 30 whose inner space forms a housing space 31; and a housing upper 40 configured to close an opening 32 of the housing lower 30. The assembling of the housing lower 30 and the housing upper 40 makes the housing space 31 inside the housing 20.

The housing lower 30 is a box-shaped member including the opening 32 which is formed in the upper surface of the housing lower 30. The housing lower 30 includes: a bottom portion 33 shaped like a flat plate; and a peripheral wall portion 34 uprightly provided on an outer peripheral edge portion of the bottom portion 33. The peripheral wall portion 34 is a frame surrounding the housing space 31, and is shaped almost like a square in a plan view.

Figure 4:
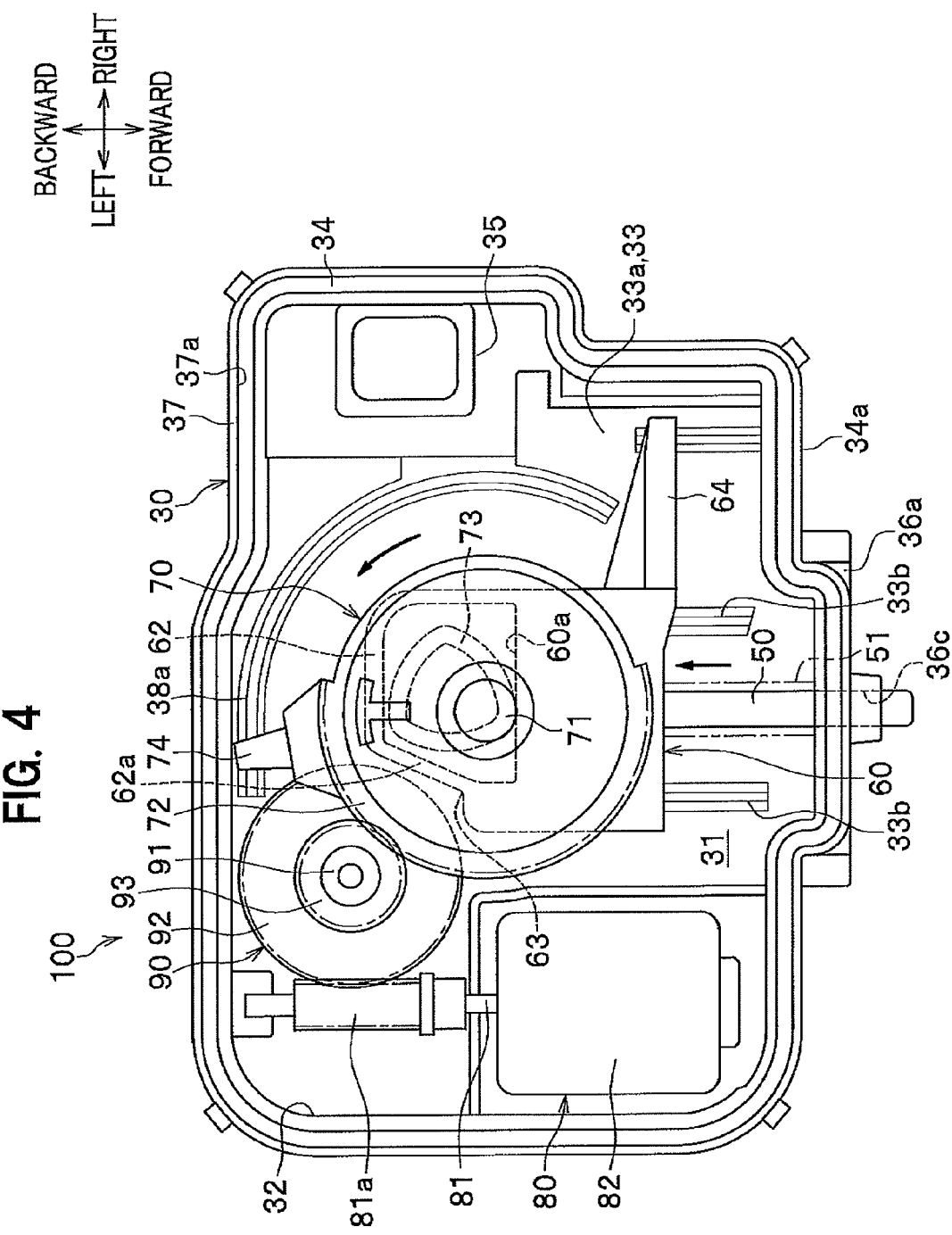
FIG. 4 is a plan view showing the inside of a housing chamber of the actuator of the embodiment with a locking pin retracted into the housing.

The bottom portion 33 is shaped almost like a square in the plan view (see FIG. 4). A male connector 35 projects downward from a right rear portion of the bottom portion 33. A female connector (not illustrated) configured to supply the electric power to the drive mechanism is coupled to the male connector 35. The female connector is electrically connected to a controller (not illustrated) installed in the vehicle 1 (see FIG. 1).

An attachment portion 36a configured to be attached to the inner surface of the wall portion 2b of the charging port 2a (see FIG. 1) is projectingly provided to the front surface 34a of the peripheral wall portion 34 of the housing lower 30. The hole portion 36c through which to insert the locking pin 50 penetrates through a middle portion of the attachment portion 36a in the right-left direction.

A couple of left and right housing supporting portions 36b configured to be attached to the power receiving connector 3 (see FIG. 1) is formed in the lower surface of the housing lower 30.

An opening edge portion 37 of the housing lower 30 (an upper end edge portion of the peripheral wall portion 34) projects outward from an outer surface of the peripheral wall portion 34 in a way that the opening edge portion 37 is shaped like a flange. A seal groove 37a into which to fit an endless seal member (not illustrated) is formed along the full circumference of the upper surface of the opening edge portion 37 (see FIG. 4).

The housing upper 40 is a flat plate-shaped lid member configured to close the opening 32 of the housing lower 30. An outer periphery of the housing upper 40 is formed in the same shape as is that of the opening edge portion 37 of the housing lower 30.

An outer peripheral edge portion of the housing upper 40 is brought into engagement with the opening edge portion 37 of the housing lower 30, and is bonded to the opening edge portion 37 with an adhesive such as a hot-melt adhesive.

In addition, the seal member (not illustrated) provided to the opening edge portion 37 of the housing lower 30 fluid-tightly seals the gap between the housing lower 30 and the housing upper 40.

The locking pin 50 is a shaft member whose cross section is shaped like a circle. The axial direction of the locking pin 50 is oriented in the forward-backward direction. The front end portion of the locking pin 50 is shaped like a hemispherical surface.

As shown in FIG. 4, a rear portion of the locking pin 50 is housed in the housing space 31 of the housing lower 30, while a front portion of the locking pin 50 projects to the outside of the housing lower 30 through the hole portion 36c formed in the front surface 34a of the peripheral wall portion 34.

As shown in FIG. 3, the drive mechanism 100 configured to extend and retract the locking pin 50 in the forward-backward direction is housed in the housing space 31 of the housing lower 30.

The drive mechanism 100 includes: a holder 60 configured to hold the locking pin 50; a cam member 70 including a cam gear 72 projectingly provided with a cam 73; an electric motor 80; and a drive transmission member 90 provided between an output shaft 81 of the electric motor 80 and the cam gear 72. The drive mechanism 100 further includes: switches 210 configured to detect the position of the locking pin 50; and a board 200 to which the electric motor 80 and the switches 210 are electrically connected.

The cam member 70 is a member configured to move the holder in the forward-backward direction. The cam member 70 includes: a rotary shaft 71 whose axial direction is oriented in the vertical direction; the cam gear 72 which is a spur gear, and which is coaxial with the rotary shaft 71; and the cam 73 projectingly provided to a lower surface of the cam gear 72. The cam 73 is eccentric from a center of turn of the cam gear 72.

As shown in FIG. 4, the cam member 70 is disposed in a central portion of the housing space 31. A lower portion of the rotary shaft 71 is inserted through a cam housing frame 62, which will be described later. A lower end portion of the rotary shaft 71 is rotatably supported by a bottom surface 33a of the housing lower 30. An upper end portion of the rotary shaft 71 projects to the outside of the housing upper 40 (see FIG. 3) through a through-hole in the housing upper 40.

A teeth surface is formed on almost a left haft of an outer peripheral surface of the cam gear 72 in FIG. 4. In addition, a rod 74 projecting outward in the radial direction is formed on the cam gear 72 (see FIG. 3). The rod 74 is a part configured to push in a detector of the switch 210 (see FIG. 3) for detecting the extension, which will be described later.

The cam 73 is a part configured to push out the holder 60, which will be described later, in the forward-backward direction (see FIG. 5), and is projectingly provided to the lower surface of the cam gear 72 (see FIG. 3).

Figure 6:
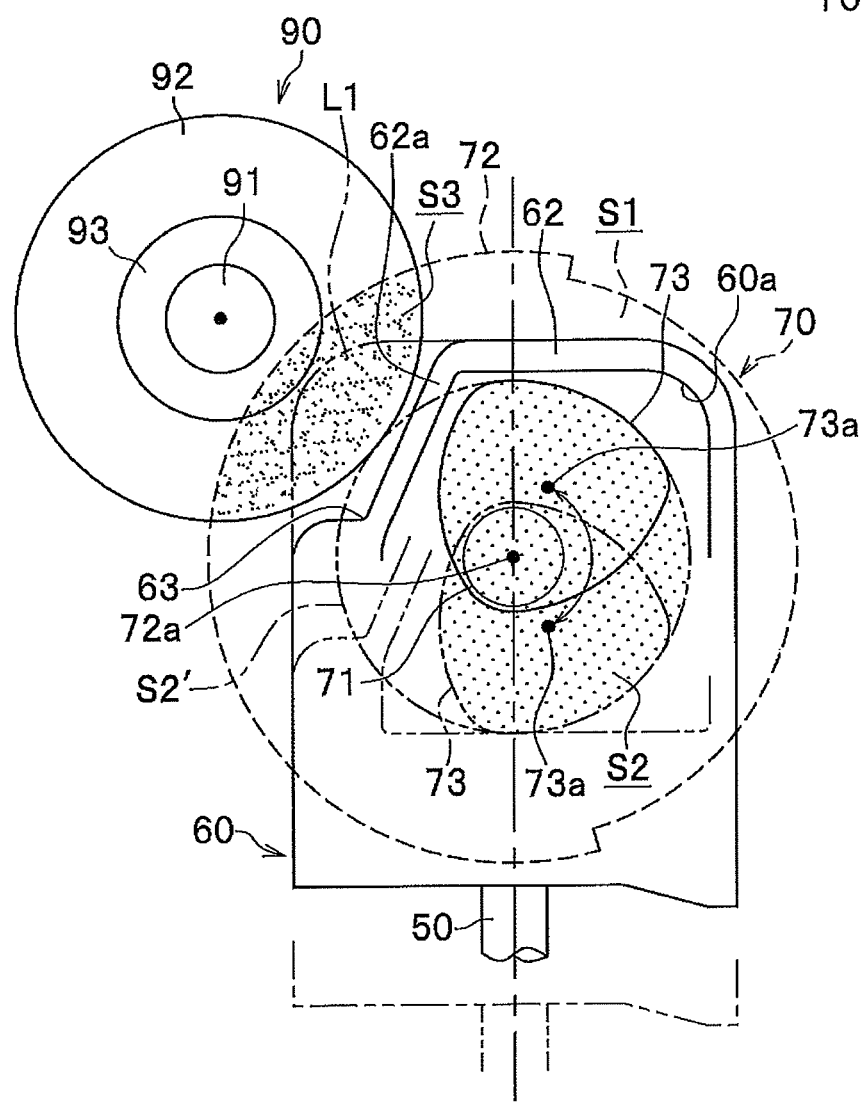
FIG. 6 is a diagram showing a position of a cam gear, a position of a drive transmission mechanism, and a movement area of a cam.

An outer periphery of the cam 73 is shaped almost like a triangle in the plan view. As shown in FIG. 6, a vicinity of one of the three corner portions of the cam 73 is disposed on the center of turn 72a of the cam gear 72. In other words, the center of turn 72a of the cam gear 72 is disposed eccentrically from a central position 73a of the cam 73 toward the vicinity of the one corner portion of the cam 73. Thus, the central position 73a of the cam 73 is eccentric from the center of turn 72a to the right.

In the cam member 70, an angle of turn of the cam gear 72 is set in a way that the cam 73 reciprocatingly turns around the center of turn 72a of the cam gear 72 within a range less than one rotation. Incidentally, in the embodiment, the cam 73 reciprocatingly turns around the center of turn 72a of the cam gear 72 within a range of approximately a third of one rotation (approximately 128 degrees).

Regardless of where the cam gear 72 is located during its turn, the central position 73a of the cam 73 is always disposed in an area to the right of the center of turn 72a of the cam gear 72 (an area to the right of the axis of the locking pin 50). For this reason, a movement area S2 of the cam 73 is shaped almost like a semicircle in a way that an amount of rightward protrusion of the movement area S2 of the cam 73 from the center of turn 72a of the cam gear 72 is larger than an amount of leftward protrusion of the movement area S2 of the cam 73 from the center of turn 72a of the cam gear 72.

As shown in FIG. 4, the electric motor 80 includes a motor housing 82 which is disposed in a left front portion of the housing space 31. In addition, the output shaft 81 projects backward from the motor housing 82. A screw gear 81a shaped like a cylinder is fitted on to the output shaft 81.

The drive transmission member 90 transmits drive force of the electric motor 80 to the cam gear 72. As shown in FIG. 3, the drive transmission member 90 includes: a rotary shaft 91 whose axial direction is oriented in the vertical direction; a lower gear 92 which is a helical gear, and which is coaxial with the rotary shaft 91; and an upper gear 93 which is a spur gear, and which is coaxial with the rotary shaft 91. The upper gear 93 is smaller in diameter than the lower gear 92. The lower gear 92 is referred to as a "first gear" in the claims, while the upper gear 93 is referred to as a "second gear" in the claims.

In the housing space 31, as shown in FIG. 4, the drive transmission member 90 is disposed backward of the motor housing 82, and between the screw gear 81a and the holder 60.

A lower end portion of the rotary shaft 91 is rotatably supported by the bottom surface 33a of the housing lower 30. An upper end portion of the rotary shaft 91 is rotatably supported by the housing upper 40 (see FIG. 3).

A teeth surface of the lower gear 92 is connected to a teeth surface of the screw gear 81a of the electric motor 80 from above. A teeth surface of the upper gear 93 is connected to the teeth surface of the cam gear 72.

A right front portion of the lower gear 92 enters a space S1 under the lower surface of the cam gear 72. As shown in FIG. 6, the space S1 under the lower surface of the cam gear 72 includes: an area S3 which a part of the lower gear 92 enters; and the movement area S2 of the cam 73.

Since the amount of leftward projection of the movement area S2 of the cam 73 from the center of turn 72a of the cam gear 72 (from the axis of the locking pin 50) is smaller, the lower gear 92 can be placed closer to the center of turn 72a of the cam gear 72. Incidentally, an imaginary movement area S2', in which the cam 73 would move if the cam 73 would make one rotation around the center of turn 72a of the cam gear 72, would interfere with the lower gear 92. In the embodiment, an outer peripheral edge portion of an imaginary movement area S2' comes into contact with an outer peripheral edge portion of the lower gear 92.

Figure 5:
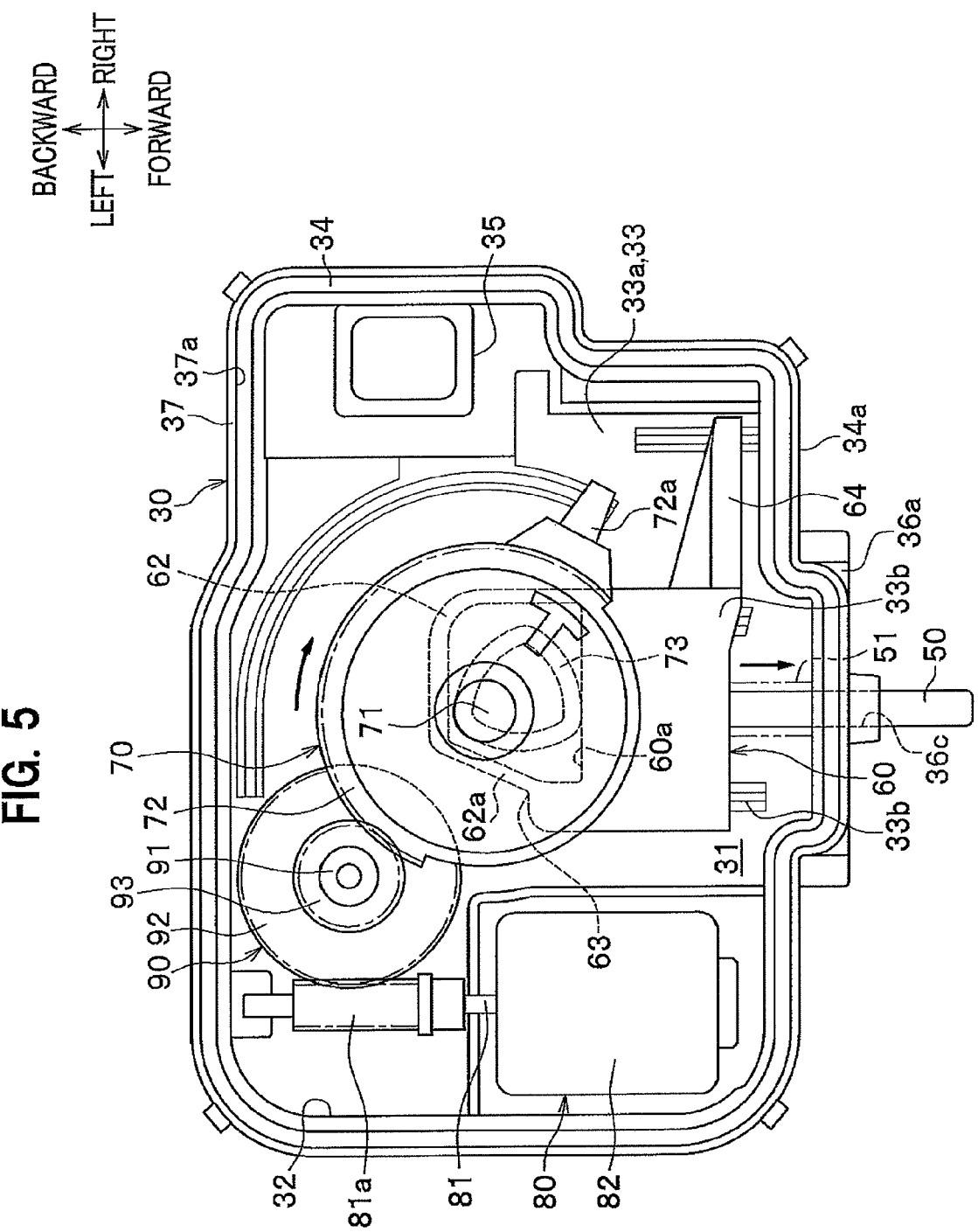
FIG. 5 is a plan view showing the inside of the housing chamber of the actuator of the embodiment with the locking pin extended from the housing.

As shown in FIGS. 4 and 5, once the screw gear 81a of the electric motor 80 is rotated, its drive force is transmitted to the lower gear 92, and the drive transmission member 90 thus rotates about its axis. Thereby, the drive force is transmitted from the upper gear 93 to the cam gear 72, and the cam gear 72 thus turns about its axis. Hence, the cam 73 turns about the axis of the rotary shaft 71.

As shown in FIG. 4, the holder 60 is disposed in the intermediate portion of the housing space 31 in the right-left direction. Front, rear, left and right side surfaces, as well as upper and lower surfaces are formed on the holder 60. A vertically-opened opening 60a and the cam housing frame 62 are formed in a rear portion of the holder 60. In addition, a recessed portion 63 is formed in a left rear portion of the holder 60.

A rod 64 projecting rightward is formed on a front portion of the right side surface of the holder 60. The rod 64 is a part configured to push in a detector of the switch 210 (see FIG. 3) for detecting the retraction, which will be described later.

A pair of left and right guide rails 33b extended in the forward-backward direction are provided to the bottom surface 33a of the housing lower 30. The holder 60 is mounted on the two guide rails 33b, and is movable along the two guide rails in the forward-backward direction.

As shown in FIG. 4, an elastic member 51 is provided between a front end surface of the holder 60 and an inner surface of the peripheral wall portion 34. The elastic member 51 is a coil spring, and the locking pin 50 is inserted through the elastic member 51. It should be noted that: the elastic member 51 is not limited to the coil spring; and various elastic members such as rubber and a disk spring may be used as the elastic member 51.

The cam housing frame 62 is an endless frame forming a peripheral wall of the opening 60a formed in the rear portion of the holder 60.

The lower portion of the rotary shaft 71 of the cam member 70 is inserted through the cam housing frame 62, and the cam 73 projectingly provided to the lower surface of the cam gear 72 is inserted into the cam housing frame 62 from above. Front and rear inner surfaces of the cam housing frame 62 form cam receiving surfaces in which a cam surface of the cam 73 comes into contact.

Figure 7:
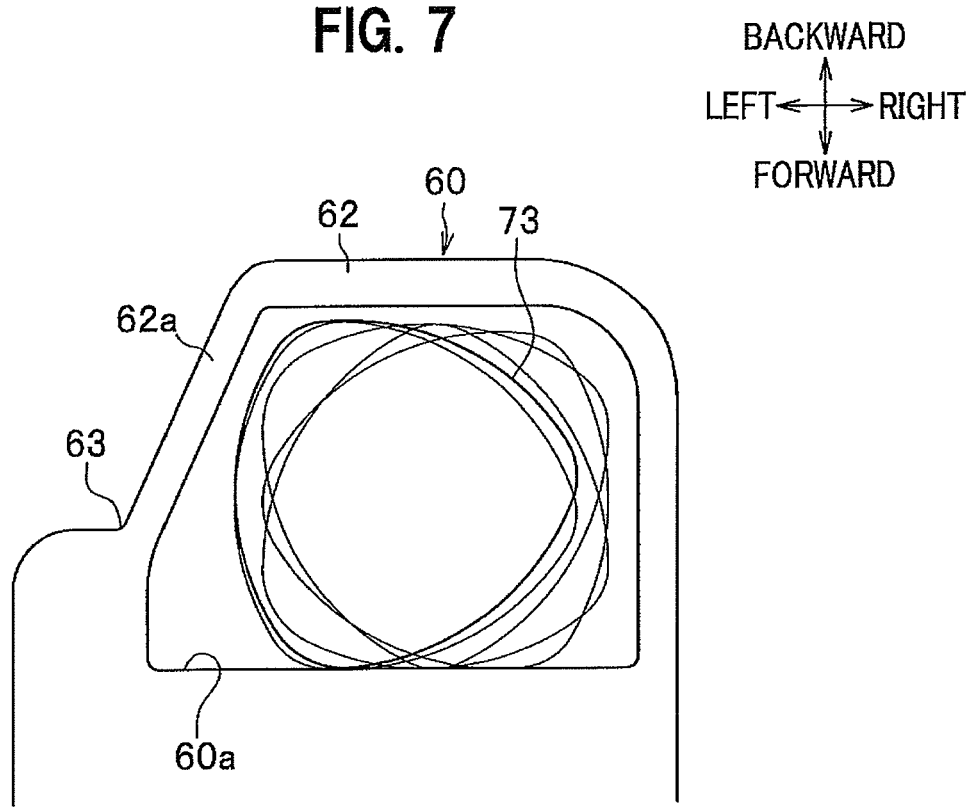
FIG. 7 is a diagram showing rotated state of the cam which turns inside the actuator of the embodiment, wherein the rotated state of the cam is shown in each certain angle of turn of the cam.

FIG. 7 shows rotated state of the cam 73 which turns inside the cam housing frame 62 in each quarter of the overall angle of turn of the cam 73. As shown in FIG. 7, all the rotated state of the turning cam 73 falls inside the cam housing frame 62.

In the embodiment, since as shown in FIG. 6, the amount of rightward protrusion of the movement area S2 of the cam 73 from the center of turn 72a of the cam gear 72 is larger, the cam housing frame 62 is disposed eccentrically from the center of turn 72a of the cam gear 72 (the axis of the locking pin 50) to the right.

As shown in FIG. 4, the recessed portion 63 set back toward the inside of the cam housing frame 62 (the opening 60a) is formed in the left rear portion of the holder 60.

As shown in FIG. 7, the recessed portion 63 is formed in an area outside an area where the cam 73 turns in the cam housing frame 62. Furthermore, as shown in FIG. 6, the recessed portion 63 is disposed in the space S1 under the lower surface of the cam gear 72, and between the lower gear 92 and the cam 73.

Reference sign L1 in FIG. 6 denotes an imaginary outline of the left half which would be made symmetrical with the right half of the cam housing frame 62 with respect to the axis of the locking pin 50 when the holder 60 is moved furthest backward. If in this manner, the left and right halves of the cam housing frame 62 would have axial symmetry with respect to the axis of the locking pin 50, the cam housing frame 62 would interfere with the lower gear 92. In contrast, in the embodiment, the recessed portion 63 is formed in the left rear portion of the holder 60. Thereby, the holder 60 is designed such that the rear portion of the holder 60 does not come into touch with the lower gear 92.

Furthermore, the recessed portion 63 is designed such that when the holder 60 is moved furthest backward, the right front portion of the lower gear 92 enters the recessed portion 63. To this end, the width of the recessed portion 63 in the right-left direction becomes larger toward the rear end in a way that the recessed portion 63 evades the lower gear 92. Thereby, an inclination portion 62a which inclines further rightward toward the rear end is formed in the left half of the cam housing frame 62.

As shown in FIG. 3, a holding hole 61 is opened in a central portion of the front end surface of the holder 60. The locking pin 50 can be held by the holder 60 by: inserting the rear portion of the locking pin 50 through the holding hole 61; and bringing a claw portion (not illustrated) in the holder 60 into engagement with an engagement groove 50a formed in the rear portion of the locking pin 50.

In the embodiment, the attachment of the locking pin 50 to the holder 60 can be achieved by: housing only the holder 60 in the housing lower 30; and thereafter inserting the locking pin 50 through the hole portion 36c from outside the peripheral wall portion 34. Since in this manner, only the holder 60 is housed in the housing lower 30 when the locking pin 50 and the holder 60 are attached to the housing lower 30, the size of the housing lower 30 can be made smaller.

As shown in FIG. 3, the board 200 is formed wider in the right-left direction, and is disposed in a front portion of the opening 32 of the housing lower 30. The board 200 is configured to control the drive of the electric motor 80. The switches 210, the electric motor 80 and the male connector 35 are electrically connected to the board 200.

In the actuator 10, as shown in FIG. 4, once the screw gear 81a of the electric motor 80 is rotated, its drive force is transmitted to the cam gear 72 via the drive transmission member 90.

As shown in FIG. 5, once the cam gear 72 is rotated in the right direction (in the clockwise direction), the cam 73 rotationally moves forward while in a state of being in contact with a front-side inner peripheral surface of the cam housing frame 62. Thus, the cam 73 pushes out the inner peripheral surface of the cam housing frame 62 forward.

Thereby, the holder 60 moves forward, and the locking pin 50 extends forward. Accordingly, an amount of protrusion of the locking pin 50 from the housing 20 increases. During this time, the elastic member 51 contracts between the holder 60 and the peripheral wall portion 34.

Once the rod 74 of the cam gear 72 pushes in the detector of the switch 210 (see FIG. 3) for detecting the extension while the holder 60 is moving forward, the switch 210 (see FIG. 3) for detecting the extension outputs a detection signal to the controller (not illustrated), and the rotation of the output shaft 81 thereby stops.

It should be noted that when the holder 60 is moving forward, elastic force of the elastic member 51 acts on the holder 60, and the front-side inner peripheral surface of the cam housing frame 62 is held in a state of being in touch with the cam 73. Thereby, the holder 60 and the locking pin 50 become stable. For this reason, the locking pin 50 can be made to stay at a predetermined extension position accurately.

Once as shown in FIG. 4, the cam gear 72 is rotated in the left direction (in the counterclockwise direction) starting from the state where the locking pin 50 extends, the cam 73 rotationally moves backward, and thus pushes out the inner surface of the cam housing frame 62 backward. Thereby, the locking pin 50 retracts backward. Accordingly, the amount of protrusion of the locking pin 50 from the housing 20 can be decreased.

Once the rod 64 of the holder 60 pushes in the detector of the switch 210 (see FIG. 3) for detecting the retraction while the holder 60 is moving backward, the switch 210 for detecting the retraction outputs a detection signal to the controller, and the rotation of the output shaft 81 thereby stops.

In the embodiment, while the cam 73 is turning backward, the elastic force of the elastic member 51 acts on the holder 60. Thereby, in response to the turn of the cam 73, the holder 60 moves backward while the front-side inner peripheral surface of the cam housing frame 62 is in the state of being in contact with the cam 73. Since in this manner, the front-side inner peripheral surface of the cam housing frame 62 is held in the state of being in touch with the cam 73 while the locking pin 50 is retracting, the holder 60 and the locking pin 50 become stable. For this reason, the locking pin 50 can be made to stay at a predetermined retraction position accurately.

Once the controller (not illustrated) detects that as shown in FIG. 1, the charging connector 4 is coupled to the power receiving connector 3, the locking pin 50 extends from the housing 20, and the front portion of the locking pin 50 is deployed above the hook 4b of the charging connector 4.

Thereby, the locking pin 50 restricts the inclining movement of the hook 4b, and the hook 4b is fixed in the state of being in engagement with the engagement protrusion 3b of the power receiving connector 3. For this reason, it is possible to prevent the charging connector 4 from coming off the power receiving connector 3.

Thereafter, once the extension of the locking pin 50 stops, the charging apparatus (not illustrated) starts to charge the storage battery (not illustrated).

In addition, once an unlock signal is inputted into the controller (not illustrated) after the charging, the locking pin 50 retracts into the housing 20, and the front portion of the locking pin 50 withdraws from above the hook 4b of the charging connector 4.

This makes the hook 4b become able to make inclining movement. Thereby, the hook 4b can be detached from the engagement protrusion 3b of the power receiving connector 3, and the charging connector 4 accordingly can be unplugged from the power receiving connector 3.

Furthermore, as shown in FIG. 3, an unlock lever 42 attached to the upper end portion of the rotary shaft 71 of the cam member 70 is provided to an upper surface of the housing upper 40 (see FIG. 2). The turning of the unlock lever 42 makes it possible to forcibly turn the cam member 70 by hand, and thereby to makes the locking pin 50 retract.

In the above-described actuator 10, since as shown in FIG. 6, the cam 73 does not make one rotation around the center of turn of the cam gear 72, the movement area S2 of the cam 73 which is formed in the space S1 under the lower surface of the cam gear 72 becomes smaller. In addition, the part of the lower gear 92 is disposed in the area into which the cam 73 does not move, which is in the imaginary movement area S2' in which the cam 73 would move if the cam 73 would make one rotation around the center of turn 72a of the cam gear 72. Thereby, in the space S1 under the lower surface of the cam gear 72, the lower gear 92 can be placed closer to the center of turn 72a of the cam gear 72.

Accordingly, in the actuator 10 of the embodiment, the space where the cam member 70 and the drive transmission member 90 are placed can be made smaller as shown in FIG. 4. For this reason, the size of the housing 20 (see FIG. 2) can be reduced.

Moreover, since the lower gear 92 is placed closer to the center of turn of the cam gear 72, the upper gear 93 is also placed closer to the center of turn of the cam gear 72. For this reason, an outer diameter of the cam gear 72 can be made smaller.

Accordingly, in the actuator 10 of the embodiment, since the size of the housing 20 (see FIG. 2) can be reduced, and since the outer diameter of the cam gear 72 can be made smaller, material costs can be cut back.

Besides, the recessed portion 63 is formed in the cam housing frame 62 in the holder 60 of the actuator 10. In addition, the lower gear 92 is placed closer to the recessed portion 63. For these reasons, the lower gear 92 can be placed closer to the center of turn 72a of the cam gear 72 (see FIG. 6) without allowing the lower gear 92 to interfere with the cam housing frame 62. Furthermore, since the cam housing frame 62 can be formed in the endless shape, the strength of the cam housing frame 62 can be secured sufficiently.

Although the foregoing descriptions have been provided for the embodiment of the present invention, the present invention is not limited to the embodiment, and modifications may be made to the present invention as needed, within a scope not departing from the gist of the present invention.

Although in the embodiment, as shown in FIG. 4, the cam housing frame 62 of the holder 60 is formed in the endless shape, the cam housing frame 62 does not have to be formed in the endless shape as long as at least front and rear inner surfaces with which the cam 73 comes into contact are formed.

For example, if the cam housing frame 62 is opened by cutting away a portion of the cam housing frame 62 between a part corresponding to the lower gear 92 and a part corresponding to the cam 73 (the portion of the cam housing frame 62 where the recessed portion 63 is formed), the lower gear 92 can be placed much closer to the center of turn 72a of the cam gear 72.

Moreover, although in the embodiment, as shown in FIG. 1, the actuator of the present invention is applied to the locking mechanism 5 configured to prevent the charging connector 4 from coming off the power receiving connector 3, the actuator of the present invention is applicable to various actuators.

REFERENCE SIGNS LIST 1 vehicle
2a charging port
3 power receiving connector
3b engagement protrusion
4 charging connector 4b hook
5 locking mechanism
10 actuator
20 housing
30 housing lower
31 housing space
34 peripheral wall portion
40 housing upper
50 locking pin
60 holder
60a opening
61 holding hole
62 cam housing frame
63 recessed portion
70 cam member
72 cam gear
73 cam
80 electric motor
90 drive transmission member
92 lower gear 92 (first gear)
93 upper gear (second gear)
100 drive mechanism
S1 space under lower surface of cam gear
S2 movement area of cam
S3 area which part of lower gear enters

The invention claimed is:

1. An actuator comprising:
a hollow housing; and
a pin projecting from an outer surface of the housing, a drive mechanism housed in the housing, and the drive mechanism configured to extend and retract the pin, wherein
the drive mechanism includes
a holder configured to hold the pin,
a cam member including a cam gear provided with a cam,
a motor, and
a drive transmission member in which a first gear and a second gear are formed coaxial with each other, driving force being transmitted from the motor to the first gear, and the second gear being connected to the cam gear,
the cam is projectingly provided to one surface of the cam gear, and is eccentric from a center of turn of the cam gear,
the cam reciprocatingly turns around the center of turn of the cam member within a range less than one rotation, and thereby pushes out the holder in a direction of extension and retraction of the pin, and
a space on a side of the one surface of the cam gear includes an area which a part of the first gear enters, and a movement area of the cam.

2. The actuator according to claim 1, wherein
a cam housing frame in which to house the cam is formed in the holder,
the cam pushes an inner surface of the cam housing frame, and thereby pushes out the holder in the direction of extension and retraction of the pin,
a recessed portion set back to an inside of the cam housing frame is formed in the holder, and
the recessed portion is disposed in the space on the side of the one surface of the cam gear, and between the first gear and the cam.

3. The actuator according to claim 1, wherein the first gear interferes with an imaginary movement area of the cam, that is based on an assumption that the cam makes one rotation around the center of turn of the cam gear.

4. The actuator according to claim 2, wherein the first gear interferes with an imaginary movement area of the cam, that is based on an assumption that the cam makes one rotation around the center of turn of the cam gear.

* * * * *